United States Patent [19]

Roche

[11] 4,233,555
[45] Nov. 11, 1980

[54] ALTERNATING CURRENT GENERATOR FOR PROVIDING THREE PHASE AND SINGLE PHASE POWER AT DIFFERENT RESPECTIVE VOLTAGES

[75] Inventor: Lawrence R. Roche, Le Center, Minn.

[73] Assignee: Dyna Technology, Inc., Minneapolis, Minn.

[21] Appl. No.: 27,409

[22] Filed: Apr. 5, 1979

[51] Int. Cl.³ .............................................. H02P 9/10
[52] U.S. Cl. ...................................... 322/25; 322/63; 322/90; 307/16
[58] Field of Search ...................... 307/16; 322/25, 28, 322/63, 89, 90, 95, 59, 93

[56] References Cited

U.S. PATENT DOCUMENTS

| 3,012,186 | 12/1961 | Wasko | 322/90 |
| 3,034,035 | 5/1962 | Baumann et al. | 322/63 X |
| 3,238,439 | 3/1966 | Hobbs et al. | 322/63 |
| 3,267,353 | 8/1966 | Franklin | 322/90 |
| 4,117,388 | 9/1978 | Roche | 322/63 X |

Primary Examiner—Robert J. Hickey
Attorney, Agent, or Firm—Burns, Doane, Swecker & Mathis

[57] ABSTRACT

The stator windings of a dynamo electric machine include three phase and single phase output windings for generating alternating current output power at different voltages. The machine output voltage is kept relatively constant by means of a brushless exciter having control and compounding field windings which are energized through stationary rectifier circuits. The rectifier circuit for energizing the field windings of the exciter is connected to or near the neutral leads of the stator windings to maintain a low voltage between the diodes of the rectifier and ground. The energization of the compounding field winding is controlled by means of a variable resistor in dependence upon whether the load connected to the dynamo electric machine is supplied with single phase or three phase current. Alternatively, the output current from the three phase windings can be full wave rectified and the output current from the single phase windings can be half wave rectified to adjust the energization of the compounding field winding.

15 Claims, 5 Drawing Figures

ALTERNATING CURRENT GENERATOR FOR PROVIDING THREE PHASE AND SINGLE PHASE POWER AT DIFFERENT RESPECTIVE VOLTAGES

BACKGROUND OF THE INVENTION

The present invention relates to dynamo electric machines, and more particularly to an alternating current generator which is capable of providing both three phase and single phase output power at different but relatively constant voltage levels.

In a conventional synchronous generator, control of the output voltage obtained from the stator windings of the generator can be obtained by energizing the field windings on the generator rotor with a D.C. current. The amplitude of the energizing current is proportional to the output voltage of the generator. One method of providing direct current for the energization of the rotating field winding is to obtain alternating current energy from the generator stator windings by means of a stationary transformer, rectify the output current of the transformer and apply the resulting D.C. signal to the rotating field winding through a slip-ring and brush connection.

A second method for energizing the field windings of the generator is through the use of a brushless excitation system having compounding and control field windings, such as that disclosed in U.S. Pat. No. 4,117,388. These field windings are energized with a rectified current proportional to the output voltage of the generator stator windings. The field windings induce a current in a rotating exciter winding. The current of the rotating exciter winding is rectified and applied to the rotating field windings of the generator as the energization signal.

In the past, a power current transformer was used to provide power in addition to the power obtained directly from the stator windings of the generator so that sufficient compounding energy will be provided to hold the generator output voltage relatively constant for all load variations from no load to anticipated full load. These transformers are specially designed to magnetically add the current and voltage excitation components to provide the necessary voltage regulating power.

Conventional synchronous generators having brushless excitation systems have been capable of producing either three phase or single phase output power at the same voltage level but not both types of power at different voltage levels. This is due to the fact that the loads on the generator may be considerably different under three phase conditions than under single phase conditions. Furthermore, the compounding energy may also have to be considerably different under the two conditions in order to maintain a relatively constant output voltage from the generator. Therefore, it was necessary to provide two different generators in those situations in which both single phase and three phase output power were desired. For example, a center pivot irrigation system utilized in farming requires 480 volt three phase power. To provide standby power in emergency conditions, a generator capable of providing 120/240 volt single phase output power is required. Therefore, a farm was required to be equipped with two separate generators to provide the necessary types of power, which involved a substantial cost.

OBJECTS OF THE INVENTION

It is therefore an object of the present invention to provide a novel brushless dynamo electric machine which is capable of providing both three phase and single phase output power at different voltages.

It is another object of the present invention to provide a novel dynamo electric machine capable of providing these two types of output signals at a relatively constant voltage level under varying load conditions.

It is a further object of the present invention to provide a novel dynamo electric machine which can be adjusted to compensate for the varying compounding energy requirements of three phase and single phase load conditions.

It is yet another object of the present invention to provide a novel dynamo electric machine which automatically compensates for the different compounding energy requirements of three phase and single phase load conditions.

It is yet a further object of the present invention to provide a novel dynamo electric machine which eliminates the need for a power current and potential transformer to provide energization current to the rotating field windings of a generator, to thereby reduce the number of parts and cost of the generator.

These and others objects and advantages of the present invention will become apparent to one of ordinary skill in the art from a perusal of the following description in conjunction with the accompanying drawings.

DETAILED DESCRIPTION

In its preferred embodiment, the present invention is disclosed with respect to a synchronous generator for providing a single phase output signal of 120/240 volts and a three phase output signal of 277/480 volts. It will be apparent to those of ordinary skill in the art, however, that the present invention can be applied to a variety of different types of dynamo electric machines.

Figure 1:
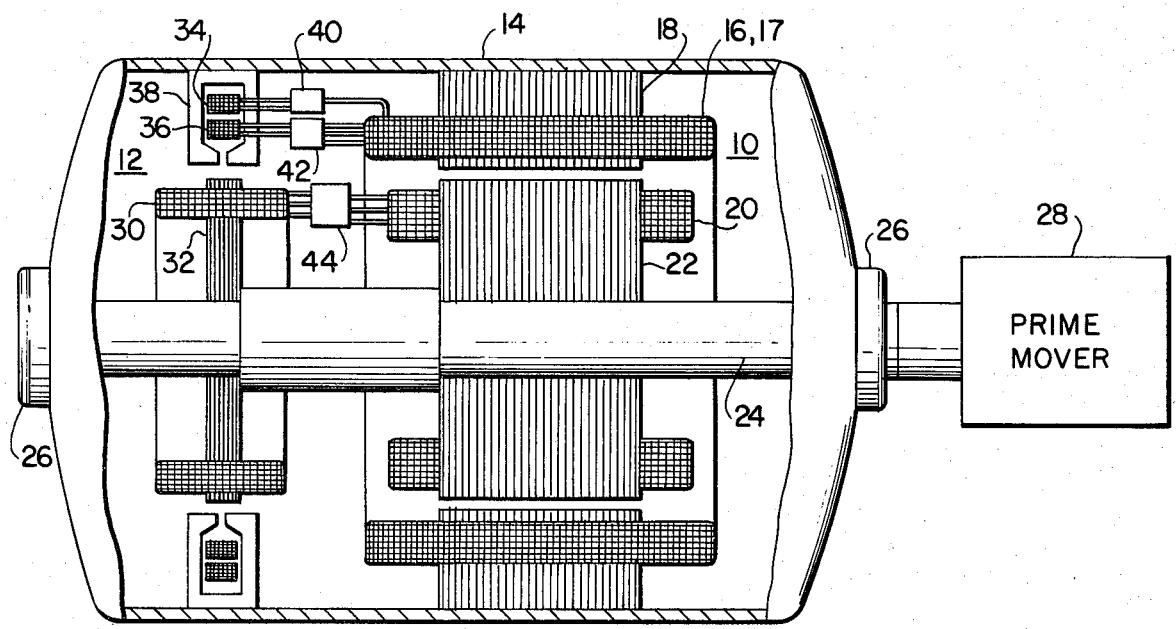
FIG. 1 is a fragmentary transverse sectional view of an alternating current generator embodying the present invention.
Figure 2A:
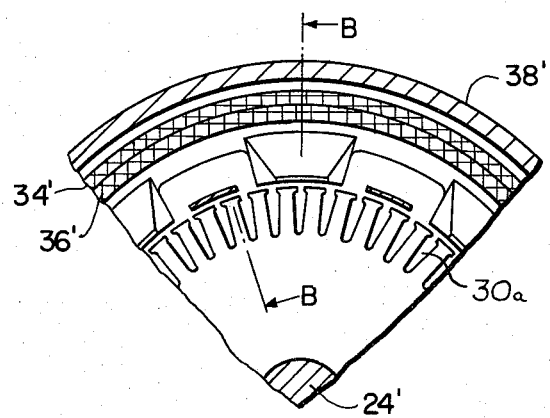
FIG. 2a is an enlarged fragmentary sectional view showing the structure of an exciter rotor and stator of a type suitable for use in the generator of FIG. 1, with the section taken in a direction transverse to the rotary axis of the generator.
Figure 2B:
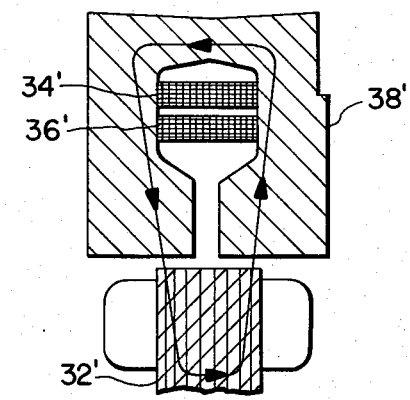
FIG. 2b is an enlarged fragmentary view of the exciter rotor and stator taken along the line B—B of FIG. 2a, showing segments of the rotor and stator windings in place.
Figure 3:
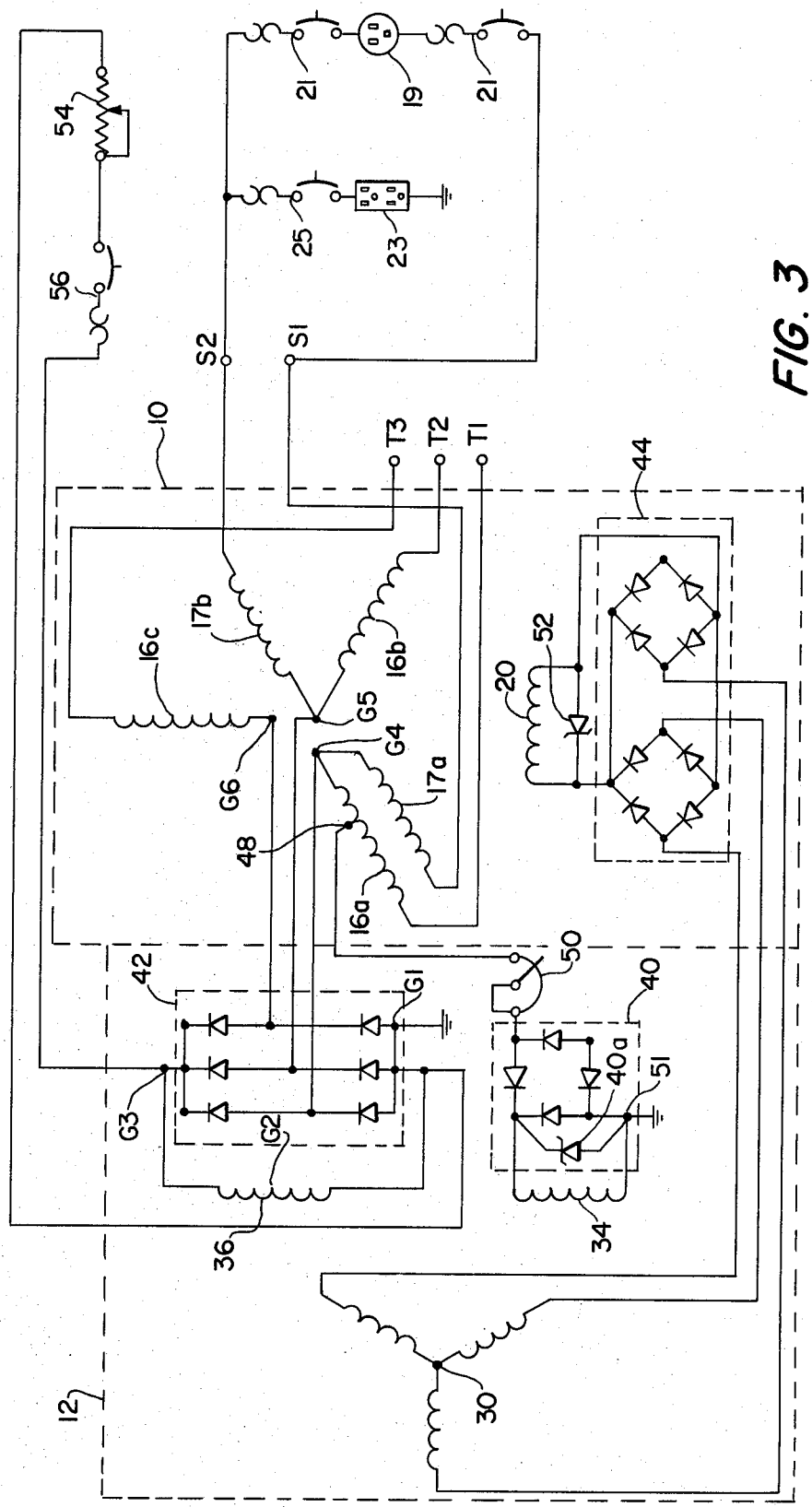
FIG. 3 is a schematic circuit diagram of a first embodiment of the present invention.

Referring to FIGS. 1 through 3 of the drawings, a dynamo electric machine incorporating the present invention includes an alternating current generator 10 and an exciter 12 disposed side-by-side in a casing 14.

Referring particularly to FIG. 1, the generator 10 includes a stator having windings 16, 17 associated with an appropriate laminated core structure 18. Within the stator is a field coil 20 having a winding associated with appropriate magnetizable laminations 22 mounted for rotation on a shaft 24. The shaft 24 is journalled in suitable bearings 26. A prime mover 28 is provided for driving the shaft 26.

The exciter 12 includes a rotor with a winding 30 disposed on a laminated core structure 32 mounted on the shaft 24 for rotation therewith. The exciter further includes two stator field windings 34 and 36 mounted concentrically in a stator core structure 38.

The radially outermost exciter stator winding 34 is a control field winding connected for energization from the generator stator winding 16 with a direct current signal by means of a rectifier circuit 40. The inner exciter winding 36 is a compounding field winding having a number of turns which is proportional to the sum of the line currents of the single phase and three phase windings in the stator windings 16, 17. This winding 36 is connected through a rectifier circuit 42 to receive a D.C. energization signal from the generator stator winding 16.

The exciter rotor winding 30 is connected through a rotating rectifier circuit 44 to supply a D.C. energization signal to the generator field winding 20 to regulate the output voltage obtained from the generator stator winding.

A portion of exciter core structures 32' and 38' and exciter stator windings 34' and 36', which are suitable for use in the generator of FIG. 1, are illustrated in transverse section in FIG. 2A. FIG. 2B illustrates the core structures of FIG. 2A in a sectional view taken along sectional line B—B of FIG. 2A. These figures show exciter rotor slots 30a and other mechanical features which are deemed not to require further description in connection with the disclosure of the present invention.

The circuit diagram of FIG. 3 illustrates the electrical connections and further electrical characteristics of the preferred form of the invention. The generator 10 may be of the synchronous type with a three phase star-connected winding having three symmetrically disposed winding elements 16a, 16b and 16c. These winding elements supply a three phase A.C. output signal of 480 volts, for example, to a load connected to the three phase output terminals T1, T2 and T3. The generator 10 also includes a single phase winding 17 having two diametrically opposed winding elements 17a and 17b for supplying a single phase output signal to two single phase output terminals S1 and S2. A receptacle 19 connected in series with a double pole 50 amp circuit breaker 21 can be connected across the single phase output terminals S1, S2 to provide a 240 volt output signal, for example. In addition, a receptacle 23 connected in series with a 15 amp circuit breaker 25 can be connected between one of the single phase output terminals S2 and ground to provide a 120 volt output signal, for example.

The neutral leads of the two single phase winding elements 17a, 17b are respectively connected to the neutral leads of two of the three phase winding elements 16a, 16b. A three phase bridge rectifier circuit 42 is connected in series with the generator at the neutral leads of the winding elements. The exciter compounding field winding 36 is connected to the output terminals of the rectifier 42 to be energized with a D.C. current proportional to the A.C. current in the generator stator windings 16, 17. One of the output terminals of the rectifier circuit 42 includes a ground connection G1 for connection to the generator load (not shown). Alternatively, the ground connection can be connected to any one of the points labelled G2-G6 in FIG. 3, or the circuit can be left ungrounded.

The exciter control field winding 34 is energized by the rectifier circuit 40 through a connection 48 at a point on one of the winding elements 16a of the three phase generator winding 16 at a location adjacent the neutral connection of the winding element 16a. A potentiometer 50 connected in series with this connection point 48 permits the adjustment of the A.C. voltage impressed on the rectifier circuit 40, and consequently the D.C. voltage impressed on the exciter control winding 34. One end of the rectifier is grounded at 51. A zener diode 40a, preferably of the selenium type, is connected across the output terminals of the rectifier diode circuit 40 to absorb transient voltages which might occur when a heavy load is suddenly connected to the generator. A standard package four-rectifier bridge is illustrated since this type of circuit can be used for simplicity and to save cost. However, a two rectifier circuit may be used in place thereof if desired.

The exciter rotor winding 30 is preferably a three phase winding. The output signal from this winding is presented to the rotating rectifier circuit 44 to supply a D.C. energizing signal to the generator field winding 20. The rectifier circuit 44 is preferably made up of a standard package of two diode bridges as shown, although other standard three phase rectifier circuits, such as the rectifier circuit 42 for energizing the exciter compounding winding 36, may be used. A zener diode 52, which may be of the selenium type, is connected across the output terminals of the rectifier circuit 44 and the generator field winding to act as a surge suppressor under transient conditions.

Since the energization provided by the compounding field winding 36 necessary to maintain a relatively constant voltage output signal may differ considerably for single phase and three phase load conditions, a variable resistor 54 is provided in parallel with the compounding field winding. The variable resistor permits the compounding current to be closely matched to the generator load over a continuous range to provide relatively constant voltage regulation of the generator output signal without requiring a voltage regulator. A switch or circuit breaker 56 can be connected in series with the variable resistor to provide a user with the option of obtaining maximum compounding current for three phase or single phase loads by disconnecting the shunt path provided by the variable resistor 54 from the excitation circuit.

In the operation of the dynamo electric apparatus described in connection with FIGS. 1-3, rotation of the shaft 24 by the prime mover 28 rotates the field winding 20 of the generator 10 relative to the stator 16 thereof. The shaft 24 simultaneously rotates the rotor winding 30 of the exciter relative to the control field winding 34 and the compounding field winding 36 of the stator thereof. A small amount of the generator voltage taken from the stator winding 16 at the connection point 48 provides excitation to the control field winding 34 to cause the exciter to apply sufficient current to the generator field winding 20 to maintain the desired generator output voltage under no-load conditions. The compounding field winding 36 is energized through the rectifier circuit 42 with a current directly proportional to the generator load current and provides additional excitation of the exciter to keep the output voltage from the generator field winding 20 approximately constant for varying generator load conditions. The zener diodes 40a and 52 provide surge suppression to absorb transient voltages that might occur when heavy loads are switched into a system to which the generator is connected.

The three phase rectifier circuit for supplying the exciter compounding winding 36 is connected in series with the generator load at the neutral leads of the generator stator windings so that the rectifiers will be near ground potential. Since the exciter compounding winding is a very low impedance winding as compared to the rated generator load impedance, the actual voltage seen by the rectifiers is a very small fraction of the generator terminal voltage (less than 1% under normal conditions). This minimizes the possibility of failure to ground and contrasts sharply with circuit arrangements in which the rectifiers are exposed to the rated voltage.

Furthermore, the connection of the point 48 for providing voltage to the rectifier circuit 40 for the exciter control field winding 34 at a location near the neutral point of the stator winding element 16a results in minimum voltage across the rectifiers of this circuit. The operation of the circuit to maintain the low voltage across the diodes, as well as additional modifications of such a circuit, are disclosed in more detail in commonly assigned U.S. Pat. No. 4,117,388, the disclosure of which is herein incorporated by reference.

The variable resistor 54 can be adjusted to trim the current through the compounding field winding 36 for a particular power factor load over a continuous range which may vary from no-load conditions to the full rated load. In order to obtain maximum compounding current, the switch or circuit breaker 56 can be opened to disconnect the variable resistor 54 from the excitation circuit.

The illustrated embodiment of the present invention is capable of providing a 120/240 volt single phase output signal at the single phase output terminals S1, S2 and a 277/480 volt three phase output signal at the three phase output terminals T1, T2, T3. The three phase and single phase output terminals of the generator are generally not used at the same time. However, a relatively small amount of single phase power may be used in conjunction with a three phase output signal.

Figure 4:
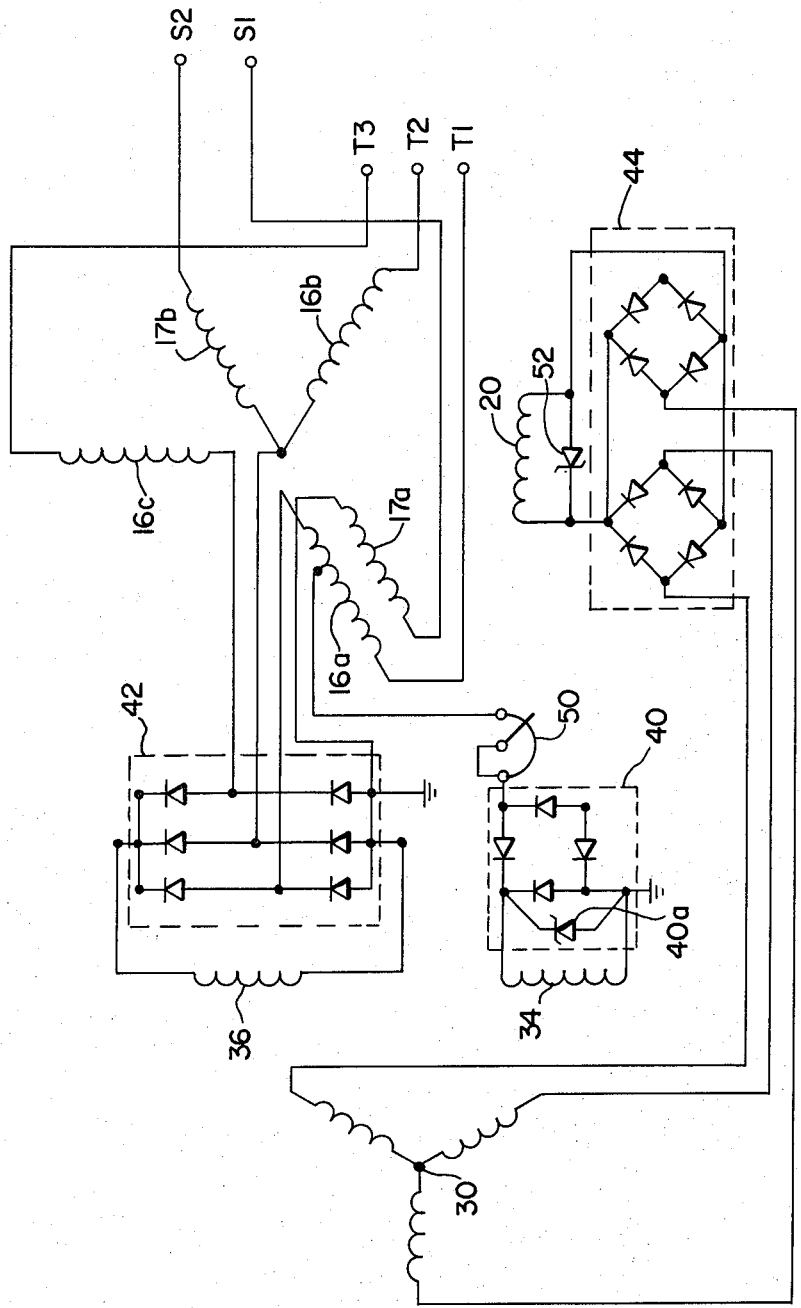
FIG. 4 is a schematic circuit diagram of a second embodiment of the present invention which is capable of automatically compensating for the different compounding energy requirements of single phase and three phase loads.

A second embodiment of the present invention which provides for automatic compensation of the compounding current in dependence upon whether a single phase or three phase load is connected to the generator is illustrated in FIG. 4. Elements corresponding to those illustrated in FIGS. 1-3 are designated with the same reference numeral.

The circuit illustrated in FIG. 4 differs from that of FIG. 3 in that the neutral lead of one of the single phase winding elements 17a is not connected to the neutral lead of one of the three phase winding elements. Rather, the neutral lead of the single phase winding element 17a is directly connected to one of the input/output terminals of the three phase bridge rectifier circuit 42. In addition, the compounding current adjustment circuit 54, 56 is eliminated.

In the operation of the circuit illustrated in FIG. 4, a three phase output signal present at the neutral leads of the three phase winding elements 16a, 16b and 16c is full wave rectified by the bridge rectifier circuit 42 and presented to the exciter compounding field winding 36. Due to the manner of connection of the single phase winding elements 17a and 17b to the rectifier circuit 42, a single phase output signal at the neutral leads of the single phase winding 17 is only half wave rectified by the rectifier circuit 42. Therefore, it can be seen that the circuit of FIG. 4 automatically reduces the compounding current when a single phase output signal is produced by the generator 10 to provide substantially constant voltage regulation without requiring a voltage regulator or power current transformer.

From the foregoing, it is apparent that the present invention provides a dynamo electric machine which is capable of providing both three phase and single phase output power at different but relatively constant voltage levels without requiring a voltage regulator. The dynamo electric machine has the capability of providing manual adjustment of the compounding current over a continuous range between no-load and full rated load conditions, or it can automatically adjust the compounding current between one of two levels in dependence upon the type of output signal which is produced by the generator, i.e., single phase or three phase.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which within the meaning and range of equivalency of the claims are therefore intended to be embraced therein.

What is claimed is:

1. A brushless dynamo electric machine for generating single phase and three phase alternating current output power at a substantially constant voltage level without requiring a voltage regulator, comprising:

a generator with a stator having a single phase and a three phase winding and a rotor having a field winding;

an exciter including a rotor winding, a control field winding and a compounding field winding;

first circuit means including first rectifier means for energizing said control field winding of the exciter responsive to the voltage of said three phase generator stator winding;

second circuit means including second rectifier means connected in series with said generator stator windings and the load on said generator for energizing said compounding field winding of the exciter in proportion to the amplitude of current in said generator stator winding;

rotary rectifier means connected to energize said rotor field winding with a D.C. voltage related to the A.C. voltage of said exciter rotor winding; and means for adjusting the degree of energization of said exciter compounding field winding by said second circuit means in dependence upon whether the single phase or three phase alternating current output signal is being supplied to the load on said generator.

2. A brushless dynamo electric machine as recited in claim 1 wherein said adjusting means is a variable resistor connected in parallel with said exciter compounding field winding.

3. The brushless dynamo electric machine of claim 2 further including a switch connected in series with said variable resistor for obtaining maximum energization of said compounding field winding.

4. A dynamo electric machine as recited in claim 1 wherein said stator windings have a neutral lead at an intermediate point thereof and said second circuit means comprises a three phase rectifier circuit connected to the neutral leads of said stator windings.

5. A dynamo electric machine as recited in claim 3 wherein said first rectifier means includes a connection across a portion of a winding element of said three phase stator winding at the neutral end thereof.

6. A dynamo electric machine as recited in claim 1 wherein said exciter compounding winding is a single phase winding.

7. The dynamo electric machine of claim 6 wherein the number of turns in said exciter compounding winding is proportional to the sum of the line currents of said single phase and three phase windings.

8. A brushless dynamo electric machine for generating single phase and three phase alternating current output signals at a substantially constant voltage level without requiring a voltage regulator, comprising:
  a generator including a three phase stator winding, a single phase stator winding, and a rotor field winding;
  an exciter including a rotor winding and a field winding;
  first rectifier means for energizing said generator rotor field winding with a direct current signal related to the alternating current signal of said exciter rotor winding; and
  second rectifier means for energizing said exciter field winding with a full wave rectified signal proportional to the amplitude of the alternating current in said three phase generator stator winding and with a half wave rectified signal proportional to the amplitude of the alternating current in said single phase generator stator winding, whereby the energization of said exciter field winding is automatically adjusted responsive to whether a load is connected to said three phase stator winding or to said single phase stator winding.

9. The brushless dynamo electric machine of claim 8 wherein said three phase stator winding includes neutral leads at an intermediate point thereof and said second rectifier means includes a three phase rectifier connected between the neutral leads of said three phase stator winding and said exciter field winding.

10. The dynamo electric machine of claim 9 wherein said single phase stator winding includes first and second winding elements with neutral leads at an intermediate point thereof, the neutral lead of said first winding element being connected to the neutral lead of one of the phase windings of said three phase stator winding and the neutral lead of said second winding element being connected to said three phase rectifier so as to provide half wave rectification of the single phase alternating current output signal.

11. The dynamo electric machine of claim 8 wherein said exciter field winding includes a control field winding and a compounding field winding, further wherein said second rectifier means energizes said compounding field winding.

12. The dynamo electric machine of claim 11 further including third rectifier means for energizing said control field winding responsive to the voltage of said three phase generator stator winding.

13. The dynamo electric machine of claim 12 wherein said third rectifier means includes a connection across a portion of a phase winding of said three phase stator winding at the neutral end thereof.

14. A brushless dynamo electric machine comprising:
  a synchronous generator comprising a first polyphase stator winding including neutral leads, a second stator winding having at least one neutral lead and a different number of phases than said first stator winding, and a single phase rotor field winding;
  a brushless exciter including a rotor winding and cooperating stator control field and compounding field windings;
  rotary rectifier means connected to energize said rotor field winding of the generator with a D.C. voltage derived from an A.C. current in said exciter rotor winding;
  first circuit means including a first rectifier means connected to energize said control field winding to excite said exciter rotor winding for no load voltage regulation of said generator in accordance with the voltage of said first polyphase stator winding; and
  second circuit means including second rectifier means connected in series with said neutral leads of said generator stator windings for energizing said compounding field winding in proportion to the amplitude of current in said generator stator windings.

15. A brushless dynamo electric machine for generating single phase and three phase alternating current output signals at a substantially constant voltage level without requiring a voltage regulator, comprising:
  a generator with a stator having a single phase and a three phase winding and a rotor having a field winding;
  an exciter including a rotor winding, a control field winding and a compounding field winding;
  means for energizing said control field winding and said compounding field winding of the exciter;
  means for energizing said rotor field winding; and
  means for adjusting the energization of said exciter compounding field winding.

* * * * *